United States Patent
Galliano, III et al.

(10) Patent No.: US 11,001,199 B1
(45) Date of Patent: May 11, 2021

(54) NON-VISUAL NOTIFICATIONS FOR AUTONOMOUS VEHICLES

(71) Applicant: GM Cruise Holdings LLC, San Francisco, CA (US)

(72) Inventors: Anthony Galliano, III, Seattle, WA (US); Arun A. Mathews, Newcastle, WA (US); Charlotte Blanc, Seattle, WA (US); Pratik Palnitkar, Kirkland, WA (US); Jacqueline Mary Shannon, Corte Madera, CA (US); Timothy Jon Meador, Fairfield, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/731,762

(22) Filed: Dec. 31, 2019

(51) Int. Cl.
*B60Q 5/00* (2006.01)
*H04W 4/02* (2018.01)
*H04R 1/02* (2006.01)
*H04R 1/40* (2006.01)
*H04R 29/00* (2006.01)
*G05D 1/02* (2020.01)

(52) U.S. Cl.
CPC ............. *B60Q 5/005* (2013.01); *H04R 1/025* (2013.01); *H04R 1/403* (2013.01); *H04R 29/002* (2013.01); *H04W 4/023* (2013.01); *G05D 1/021* (2013.01); *H04R 2499/13* (2013.01)

(58) Field of Classification Search
CPC ..................................................... H04W 4/02
See application file for complete search history.

(56) References Cited

U.S. PATENT DOCUMENTS

| | | | |
|---|---|---|---|
| 2008/0041942 A1* | 2/2008 | Aissa | G06Q 20/341 235/382 |
| 2017/0215031 A1* | 7/2017 | Harding | G01C 21/3697 |
| 2018/0213355 A1* | 7/2018 | Smith | G01S 13/878 |
| 2020/0339068 A1* | 10/2020 | Karaila | B60R 25/104 |

* cited by examiner

*Primary Examiner* — Nabil H Syed
*Assistant Examiner* — Cal J Eustaquio
(74) *Attorney, Agent, or Firm* — Patent Capital Group (57) ABSTRACT

An audio notification system for an autonomous vehicle (AV) determines that the AV is within range of a user and emits a sound though a speaker of the AV to notify that the user that the vehicle has arrived. The audio notification system may include a sensor for sensing that the user has accessed the AV, and turns off the sound in response to the user accessing the AV. The audio notification may be generated according to one or more audio options, e.g., volume, pitch, or audio pattern.

18 Claims, 5 Drawing Sheets

NON-VISUAL NOTIFICATIONS FOR AUTONOMOUS VEHICLES

TECHNICAL FIELD OF THE DISCLOSURE

The present disclosure relates generally to autonomous vehicles (AVs) and, more specifically, to devices and methods for interacting with users of such vehicles using audio or non-visual cues.

BACKGROUND

Conventional delivery systems interact with users by providing notifications to users' mobile devices. For example, food delivery services typically alert users that their order is on its way, or has arrived, via in-app notifications or text messages. Similarly, ridesharing systems allow users to track their drivers in an app, and alerts users that a driver has arrived in the app or via a text message. Such visual, device-based notifications are not suitable or convenient for all users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Vehicle-based services, such as ridesharing and delivery services, often rely on in-app notifications to alert users to the arrival of the vehicle. For example, a delivery app may allow a user to track the delivery progress, and may text the user when the delivery is arriving. Such visual, device-based notifications are not suitable or convenient for all users, including users who have difficulty using apps or mobile phones, and users who are blind or have impaired vision. In other examples, drivers notify users upon arrival, e.g., a driver knocks on the user's door with a delivery. In autonomous vehicle (AV) contexts, a driver is not present, and the user may have to find the AV without the assistance of another human.

An audio notification system provides an audio notification from the AV that informs the user that the AV has arrived. The audio notification may be specific to the user, e.g., a specific sound pattern that the user is expecting, or a pitch or volume that the user is able to hear. Embodiments disclosed herein may be particularly advantageous for increasing accessibility of AV applications, e.g., ridesharing or delivery by an AV. Audio notifications are especially useful for users who are visually impaired or have difficulty using a mobile device.

Embodiments of the present disclosure provide an audio notification system for a vehicle. The audio notification includes a speaker configured to emit sound, a sensor configured to sense that a user has accessed the vehicle, and a processor. The processor is configured to determine that the vehicle is within a range of the user, access an instruction for generating a sound for notifying the user that the vehicle as arrived within the range of the user, provide the instruction to the speaker, and in response to receiving a signal from the sensor indicating that the user has accessed the vehicle, provide an instruction to the speaker to stop emitting the sound.

Embodiments of the present disclosure also provide a method for providing a notification to a user, and a computer-readable medium comprising instructions for performing the method. The method includes determining that a vehicle is within a range of a user; accessing an instruction for generating a sound for notifying the user that the vehicle has arrived within the range of the user; in response to determining that the vehicle is within the range of the user, instructing a speaker on the vehicle to emit the sound according to the instruction; determining that the user has accessed the vehicle; and in response to determining that the user has accessed the vehicle, instructing the speaker to stop emitting the sound.

Further embodiments of the present disclosure provide an audio notification system for a vehicle that includes a speaker configured to emit sound according to a plurality of audio options available for an audio notification; a memory configured to store instructions for generating sound according to the plurality of audio options; and a processor. The processor is configured to receive a selection of an audio option for notifying a user that the vehicle has arrived within a range of the user, determine that the vehicle is within a range of the user, retrieve from the memory an instruction for generating a sound according to the received selection, and provide the retrieved instruction to the speaker to emit sound according to the received selection.

Embodiments of the present disclosure also provide a vehicle management system comprising a user interface server and a vehicle manager. The user interface server is configured communicate with a user interface with which a user accesses a service of the vehicle management system, the user interface configured to provide a plurality of audio options to a user, receive a user selection of one of the plurality of audio options, and transmit the selected audio option to the user interface system for storage by the vehicle management system. The vehicle manager is configured to select a vehicle in a fleet of vehicles to dispatch to the user, retrieve the selected audio option for the user from storage, and transmit the selected audio option to the selected vehicle. The selected vehicle is configured to output an audio notification according to the selected audio option.

Embodiments of the present disclosure still further provide a method including receiving a selected audio option of a plurality of audio options for notifying a user that the vehicle has arrived within a range of the user; determining that the vehicle is within a range of the user; retrieving, from a memory storing instructions for generating sound according to the plurality of audio options, an instruction for generating a sound according to the selected audio option; and providing the retrieved instruction to the speaker to emit sound according to the selected audio option.

As will be appreciated by one skilled in the art, aspects of the present disclosure, in particular aspects of audio notifications for autonomous vehicles, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV with Non-Visual Interface

Figure 1:
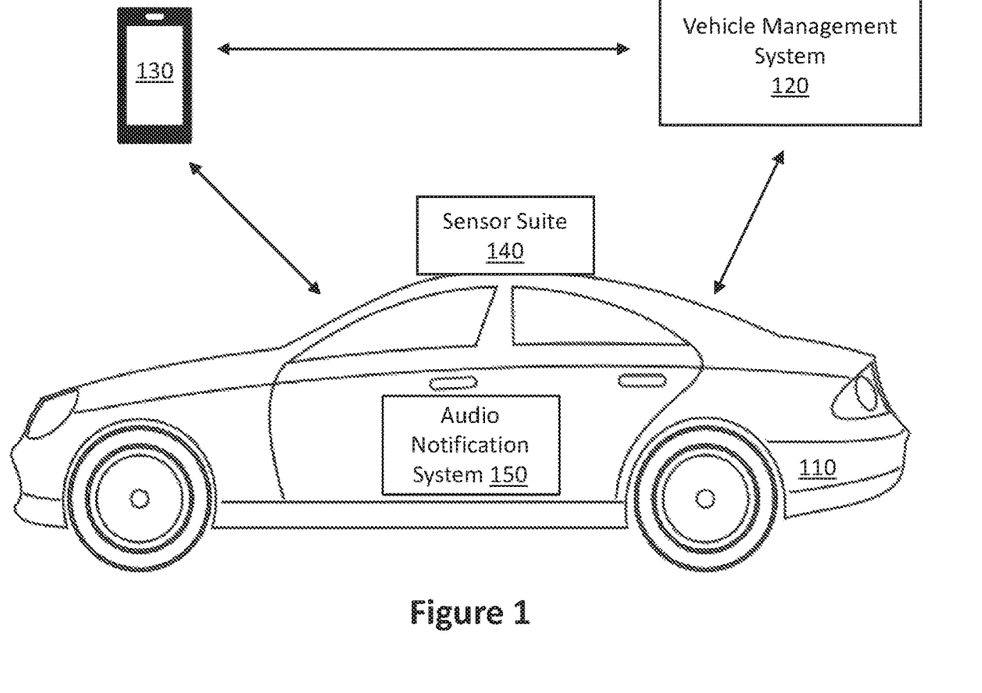
FIG. 1 is a block diagram illustrating a system including an example AV in which a non-visual interface according to some embodiments of the present disclosure may be implemented.

FIG. 1 is a block diagram illustrating a system 100 in which an example autonomous vehicle in which a non-visual interface according to some embodiments of the present disclosure may be implemented. The system 100 includes an autonomous vehicle (AV) 110, a vehicle management system 120, and a user device 130. The AV 110 includes a sensor suite 140 and an audio notification system 150. The system 100 enables the AV 110 to provide audio notifications to a user of the user device 130 when the vehicle 110 is to be accessed by the user, e.g., when the AV 110 has reached the user's location.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AVs may be vehicles that switch between a semi-autonomous state and a fully autonomous state and thus, some AVs may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, RADAR, SONAR, LIDAR, GPS, wheel speed sensors, inertial measurement units (IMUs), accelerometers, microphones, strain gauges, pressure monitors, barometers, thermometers, altimeters, etc. The sensors may be located in various positions in and around the automated vehicle 110. In some embodiments, the sensor suite 140 also includes sensors for finding and connecting to local wireless signals, e.g., Bluetooth, Zigbee, and/or Wi-Fi interfaces.

An onboard computer (not shown in FIG. 1) is connected to the sensor suite 140 and functions to control the AV 110 and to process sensed data from the sensor suite 140 and/or other sensors in order to determine the state of the AV 110. Based upon the vehicle state and programmed instructions, the onboard computer modifies or controls behavior of the AV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

In some embodiments, the sensor suite 140 and/or onboard computer are configured to identify people in the area of the AV 110. For example, the sensor suite 140 collects images and other data describing the environment of the AV 110 (e.g., using the cameras, RADAR, and LIDAR), and the onboard computer analyzes the collected data to identify a human in the environment.

The audio notification system 150 provides audio notifications to users. For example, the audio notification system 150 emits a sound when the AV 110 is within range of the user. The sound alerts the user that the AV 110 has arrived and allows the user to identify the AV 110. The audio notification system 150 is described further in relation to FIG. 2.

Figure 6:
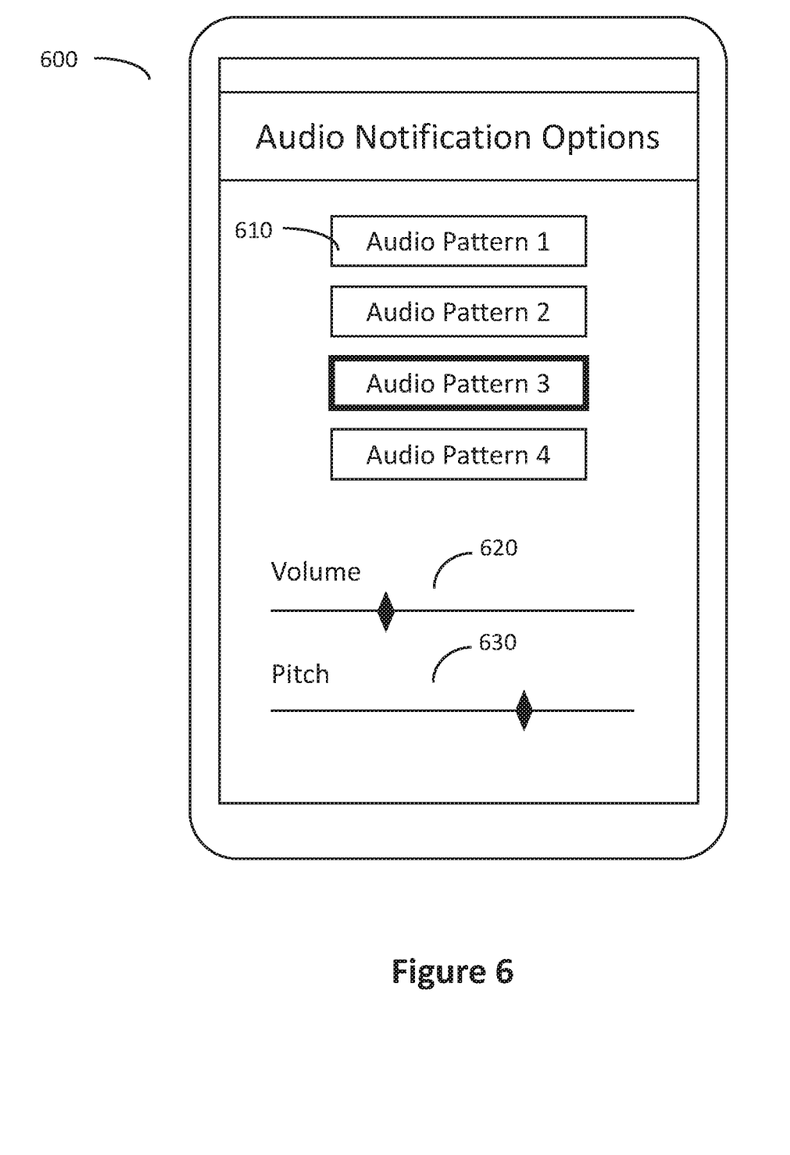
FIG. 6 is an example user interface for setting options for an audio notification according to some embodiments of the present disclosure.

The user device 130 may be a mobile device, tablet, computer, or other device for interfacing with a user of the AV 110. The user device 130 may provide one or more applications (e.g., mobile device apps, browser-based apps) with which a user can interface with a service that provides or uses AVs. For example, the service provides rides to users in AVs, or the service provides deliveries of items, prepared foods, groceries, etc. to users using AVs. The service, and particularly the AVs associated with the service, is managed by the vehicle management system 120. The vehicle management system 120 may provide the application to the user device 130. In particular, the vehicle management system 120 may provide a user interface with which a user of the user device 130 can select one or more audio options. An example of a user interface for selecting audio options is shown in FIG. 6. The vehicle management system 120 may select an AV from a fleet of AVs, and instruct the selected AV (e.g., AV 110) to drive to a location of the user (e.g., the location of the user device 130, or an address associated with the user). The vehicle management system 120 instructs the audio notification system 150 of the AV to provide an audio notification to the user according to the audio option(s) selected by the user. The vehicle management system 120 is described further in relation to FIG. 2.

As shown in FIG. 1, the user device 130 communicates with the vehicle management system 120. The user device 130 and vehicle management system 120 may connect over a public network, such as the Internet. The vehicle management system 120 also connects to the AV 110, e.g., over the Internet. In some embodiments, the user device 130 can communicate with the AV 110. For example, the user device 130 may emit a short-range wireless signal (e.g., a Bluetooth signal), and the AV 110 may be configured to detect the short-range wireless signal and, in response to detecting the signal, determine that the AV 110 has reached the vicinity of the user.

Example Audio Notification System

Figure 2:
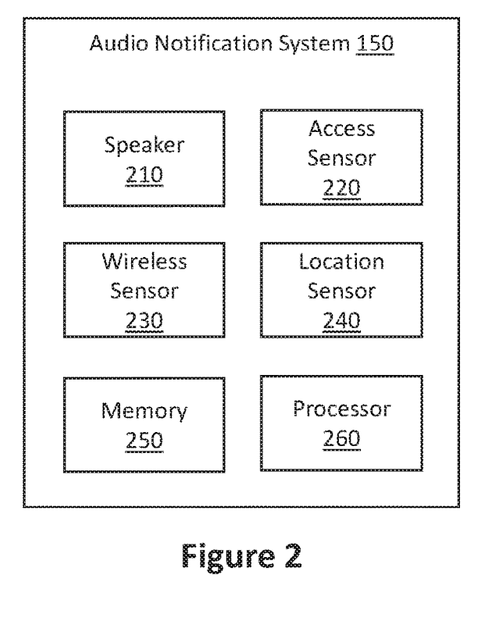
FIG. 2 is a block diagram illustrating an audio notification system according to some embodiments of the present disclosure.

FIG. 2 is a block diagram illustrating the audio notification system 150 according to some embodiments of the present disclosure. The audio notification system 150 includes a speaker 210, an access sensor 220, a wireless sensor 230, a location sensor 240, a memory 250, and a processor 260. In alternative configurations, different and/or additional components may be included in the audio notification system 150. For example, FIG. 2 illustrates one speaker 210, but the audio notification system 150 may include additional speakers. Further, functionality attributed to one component of the audio notification system 150 may be accomplished by a different component included in the audio notification system 150 or a different system than those illustrated.

The speaker 210 is located on the AV 110 for emitting sounds outside the AV 110, including audio notifications. The speaker 210 is able to emit sounds that are audible at least around a certain range of the vehicle, e.g., 50 feet from the AV 110, or 100 feet from the AV 110, so that a user within this range of the AV 110 may locate the AV 110 based on the sound. In some embodiments, the speaker 210 produces a fixed sound or set of sounds. For example, the speaker 210 may be a car horn, or the speaker 210 may be a siren configured to produce one or a set of siren sounds. In other embodiments, the speaker 210 may reproduce a larger range of sounds, e.g., words (e.g., "Hello Jessica! Your ride is here!"), jingles, beeps, etc. In some embodiments, the speaker 210 generates an audible vibration or a buzzing sound.

In some embodiments, the AV 110 is an electric vehicle (EV), and the speaker 210 is a low-speed noise emitter. The low speed noise emitter emits a sound from the EV when the AV 110 travels at a low speed, e.g., below 15 miles per hour, or below 30 miles per hour, so that pedestrians and others in the vicinity of the EV can hear the EV. In this embodiment, the low-speed noise emitter is instructed to produce an audio notification for a user. The audio notification may be the same sound emitted during low speed travel or a different sound, depending on the capabilities of the low-speed noise emitter. If the low-speed noise emitter emits a single type of sound (e.g., an artificial car sound), the speaker 210 can be instructed to produce the sound with a pattern, i.e., repeatedly turning the sound off and on in a pulse pattern, to distinguish the audio notification from the sound of a moving car.

Figure 4:
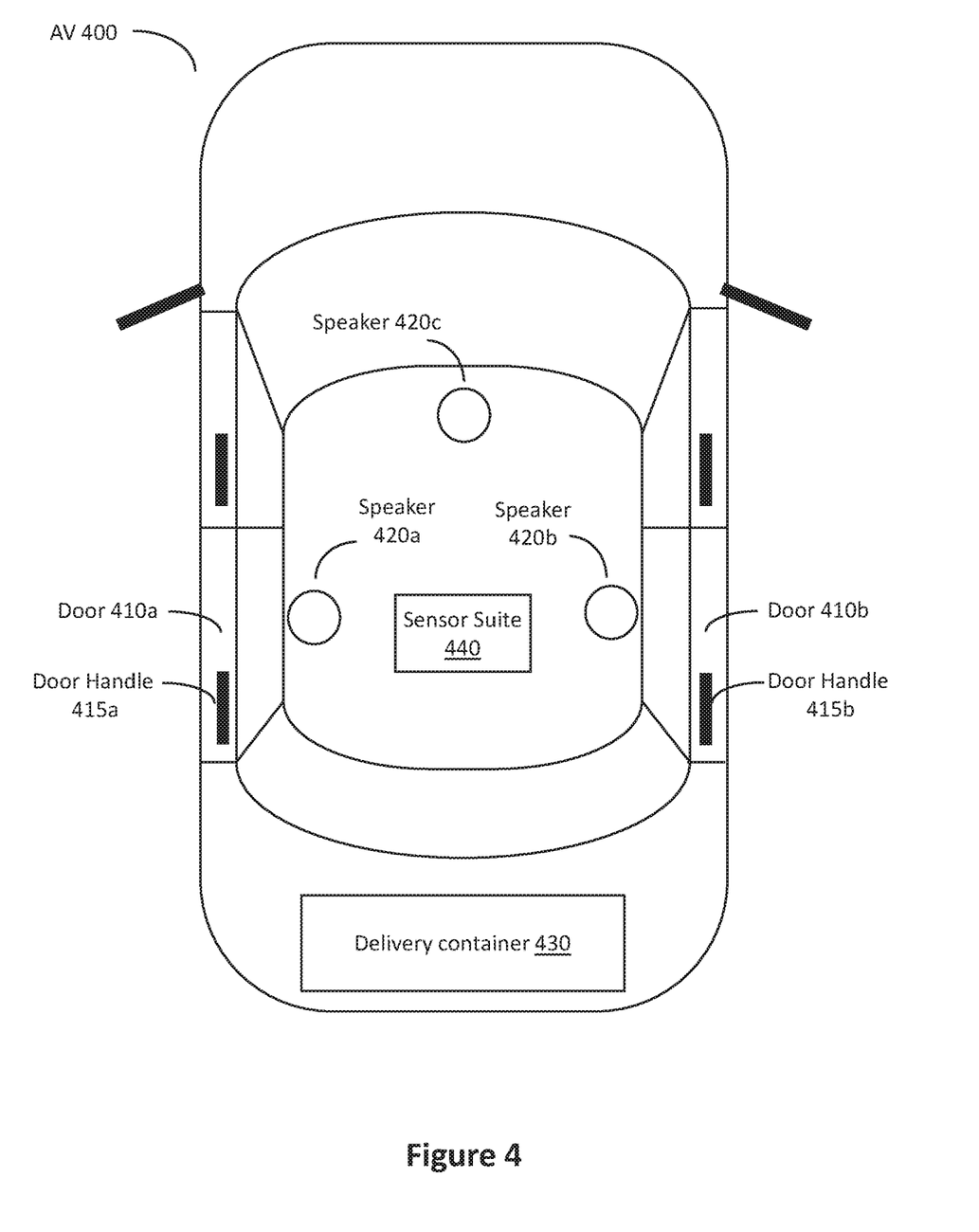
FIG. 4 is an example top view of an AV with multiple speakers according to some embodiments of the present disclosure.

In some embodiments, multiple speakers 210 of any of the types described above are mounted in different locations of the AV 110. An example of this is shown in FIG. 4. In some embodiments, the speaker 210 is a directional speaker that can emit sound in a particular direction selected from a larger range of directions. For example, the audio notification system 150 may determine the direction of the user relative to the speaker 210 and instruct the speaker 210 to emit sound in that direction.

The access sensor 220 senses when the AV 110 has been accessed. The access sensor 220 may be a sensor for sensing that a door has been opened, e.g., one of the doors to a seating area of the AV 110 or a door to a trunk or cargo area of the AV 110. As another example, the access sensor 220 may be a proximity sensor that senses when a user has come within a certain range of the access sensor 220, e.g., within a foot or a few feet of the access sensor 220. In some embodiments, the AV 110 has an integrated delivery container, and the access sensor 220 senses when the delivery container has been opened. The audio notification system 150 may include multiple access sensors 220, e.g., one on each door of the AV 110, or one on each door handle of the AV 110.

The wireless sensor 230 is a sensor for detecting a wireless signal emitted by the user device 130. In some embodiments, the user device 130 emits a short-range wireless signal (e.g., a Bluetooth signal), and the wireless sensor 230 is configured to detect the short-range wireless signal output by the user device 130. The short-range wireless signal may identify the user device 130 to the wireless sensor 230, so that the wireless sensor 230 can distinguish the user device 130 of the intended user from other user devices in the area of the AV 110. In response to the wireless sensor 230 detecting the wireless signal, the audio notification system 150 (e.g., the processor 260) determines that the user device 130 is within a range of the AV 110, e.g., the range of the short-range wireless signal. In some embodiments, the wireless sensor 230 detects a strength of the wireless signal, and the wireless sensor 230 or processor 260 estimates a distance of the user device 130 based on the strength of the detected wireless signal. In other embodiments, the wireless sensor 230 is not included in the audio notification system 150, and other methods are used to determine whether the AV 110 is near the user and/or user device 130.

The location sensor 240 determines a current location of the AV 110. The sensor suite 140 typically includes one or more sensors for determining the location of the AV 110, such as a GPS sensors and one or more IMUs. The location sensor 240, which may be included in the onboard computer of the AV 110, receives signals from these sensors to determine a current location of the AV 110. The location determined by the location sensor 240 can be used to determine if the user, or the user device 130, is within a range of the AV 110, e.g., by comparing an address of the user, or a real-time location of the user device 130, to the location determined by the location sensor 240.

The memory 250 stores data for generating audio notifications from the speaker 210. For example, the memory 250 stores instructions for generating one or more audio patterns that can be emitted by the speaker 210. The memory 250 may store audio options selected for the user (e.g., by the vehicle management system 120 or by the user (e.g., via a user interface provided on the user device 130). The audio options may include volume, pitch, and/or frequency (i.e., a number of times that an audio signal is emitted during a given time period). In some embodiment, audio options include a selection of a particular audio pattern, such as a jingle or word(s), for the speaker to reproduce.

The processor 260 receives signals from the access sensor 220, wireless sensor, and location sensor 240. The processor 260 processes these signals to determine whether to emit an audio notification, accesses data in the memory 250 to retrieve or generate instructions for producing an audio notification, and transmits the instructions to the speaker 210 to emit the audio signal. In particular, the processor 260 determines that the vehicle is within a range of the user based on signals from the wireless sensor 230 and/or location sensor 240. For example, the processor 260 receives a signal from the wireless sensor 230 indicating that the wireless detector 230 has detected a wireless signal from the user device 130. Based on this signal, the processor 260 determines that the user device 130 is within a range of the AV 110, e.g., the range of the short-range wireless signal. In another example, the location sensor 240 determines a current location of the AV 110. The processor 260 accesses a location of the user, e.g., a pick-up or delivery address entered by the user into a user interface, or a real-time location of the user device 130. The processor 260 compares the current location of the AV 110 to the location of the user to determine a distance from the AV 110 to the user. If the distance is less than a predetermined range distance (e.g., within 25 feet or within 100 feet), the processor determines that the AV 110 is within the range of the user.

The processor 260 accesses an instruction for generating a sound for notifying the user that the AV 110 has arrived within the range of the user from the memory 250. For example, the processor 260 retrieves instructions for generating a sound for the user from the memory 250. The instructions may include a particular volume, pitch, audio pattern, or other audio characteristics. The processor 260 provides the instructions to the speaker 210, which emits sound (i.e., the audio notification) according to the instructions.

As noted above, in some embodiments, the speaker 210 is a directional speaker. In such embodiments, the processor 260 may identify a location of the user, determine a direction of the user relative to the speaker 210, and instruct the speaker 210 to emit the sound in that direction. For example, the processor 260 receives a real-time location of the user device 130, and sets the location of the user device 130 as the location of the user. The processor 260 compares the location of the user device 130 to the location of the AV 110 (as determined by the location sensor 240) to determine the direction of the user relative to the speaker 210. In another example, as described with respect to FIG. 1, the onboard computer may identify a human in the environment of the AV 110. The processor 260 receives data describing the location of the identified human from the onboard computer and sets this location as the location of the user. The location of the user may be identified in directional terms, e.g., at a particular angle relative to the AV 110. This direction may be used as the direction for the directional speaker to emit the audio notification.

After the user has accessed the AV 110, the processor 260 receives a signal from the access sensor 220 indicating that the user has accessed the vehicle (e.g., the access sensor 220 determines that a door has been opened). In response to this signal, the processor 260 provides an instruction to the speaker 210 to stop emitting the audio notification.

In some embodiments, if the user has not accessed the AV 110 after a threshold period of time, the processor 260 provides an instruction to the speaker 210 to alter the audio notification. For example, if the user has not accessed the AV 110 within the threshold period (e.g., one minute or three minutes), the processor 260 instructs the speaker 210 to increase the volume (e.g., if the user could not hear the first audio notification), change the pitch (e.g., to a lower pitch, if an initial higher pitch may have been inaudible to an older user), or change the pattern (e.g., shorten a time period between which consecutive sounds in a pulse pattern are emitted, to better attract the attention of the user).

In some embodiments, the AV 110 (e.g., the sensor suite 140 and onboard computer) monitors the progress of the user in approaching the AV 110, and the processor 260 alters the audio notification in response to the user moving farther away or closer to the AV 110. For example, if the AV 110 first identifies a user within a first range (e.g., 20 feet), and the user moves into a second range from the AV 110 shorter than the first range (e.g., 10 feet), the processor 260 may instruct the speaker 210 to lower the volume of the audio notification, or to alter a pattern of the audio notification (e.g., increase a pitch of the audio notification or a frequency of an on-off pulse pattern, to indicate that the user has moved closer). As another example, if the AV 110 first identifies a user within a first range (e.g., 20 feet), and the user moves into a second range from the AV 110 longer than the first range (e.g., 40 feet), the processor 260 may instruct the speaker 210 to increase the volume of the audio notification, or to alter a pattern of the audio notification (e.g., lower a pitch of the audio notification or a frequency of an on-off pulse pattern, to indicate that the user has moved farther away). In some embodiments, the processor 260 may instruct the speaker 210 to provide spoken instructions, e.g., "I'm on your left!" or "You're getting closer!" based on the progress of the user towards the AV 110.

Example Vehicle Management System

Figure 3:
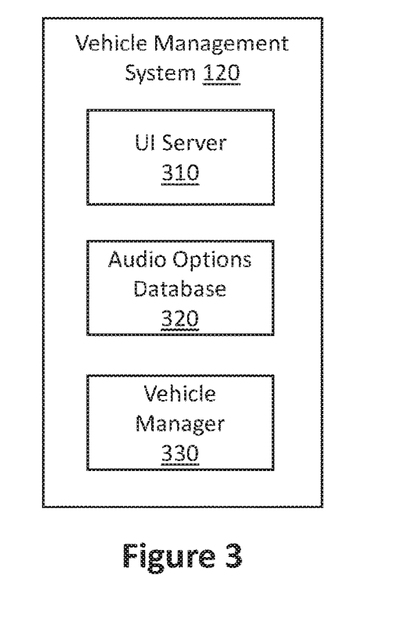
FIG. 3 is a block diagram illustrating a vehicle management system according to some embodiments of the present disclosure.

FIG. 3 is a block diagram illustrating the vehicle management system 120 according to some embodiments of the present disclosure. The vehicle management system 120 includes a UI (user interface) server 310, an audio option database 320, and a vehicle manager 330. In alternative configurations, different and/or additional components may be included in the vehicle management system 120. Further, functionality attributed to one component of the vehicle management system 120 may be accomplished by a different component included in the vehicle management system 120 or a different system than those illustrated.

The UI server 310 is configured to communicate with a client device, e.g. user device 130, that provides a user interface to a user. For example, the UI server 310 may be a web server that provides a browser-based application to the user device 130, or the UI server 310 may be a mobile app server that interfaces with a mobile app installed on the user device 130. The UI server 310 may provide the user interface to the user device 130. The UI server 310 receives data submitted by the user into the user interface. The user interface enables the user to access a service of the vehicle management system, e.g., to request a ride from the AV 110, or to request a delivery from the AV 110.

The audio options database 320 stores audio options for audio notifications. For example, the audio options database 320 stores audio options selected by users in the user interface. In some embodiments, the user interface provides various audio options to the user, and the user interface receives a user selection of one or more audio options. An example user interface for providing audio options is shown in FIG. 6. In some embodiments, the user interface provides an option for whether or not to emit an audio notification for the user. The user interface transmits the selected audio options to the UI server 310, which receives the selected audio options. The UI server 310 stores the audio options selected by the user in the audio options database 320.

In some embodiments, one or more audio options are selected by the vehicle management system 120. For example, a user may be assigned a particular audio pattern (e.g., a default audio pattern, or a specific audio pattern for that user). In another example, the audio options database 320 includes audio settings for a particular service. For example, an audio notification for a ride service follows a given format, e.g., "Hello <first name>, your ride is here!"; an audio notification for a delivery service is a jingle used by the ride service. In such embodiments, the UI server 310 may transmit data describing the audio options (e.g., a sound file or instructions for emitting a sound) selected by the vehicle management system 120 to the user device 130. The user device 130 outputs audio according to the data describing the audio options to inform the user of the selected audio options. For example, the audio options may be a particular jingle, and the user device 130 plays the jingle to the user before the AV arrives so that the user knows which jingle to listen for.

The vehicle manager 330 manages and communicates with a fleet of AVs, including AV 110. The vehicle manager 330 may assign AVs to various tasks and direct the movements of the AVs in the fleet. The vehicle manager 330 provides instructions to AVs to provide audio notifications. For example, the vehicle manager 330 selects an AV (e.g., AV 110) in a fleet of vehicles to dispatch to the user, e.g., based on a request for a service received at the UI server 310. The vehicle manager 330 retrieves audio options associated with the requesting user from the audio options database 320. The vehicle manager 330 transmits the audio options to the selected AV, which outputs an audio notification to according to the audio options. In some embodiments, the audio options transmitted to the AV include a sound file for the audio notification. In other embodiments, the AV 110 locally stores the sound file(s) used to generate audio notifications.

In some situations, the vehicle manager 330 may assign multiple AVs to the same geographic area. In such situations, different audio options can be used to assist users in locating the correct AV. For example, if one audio option (e.g., a particular jingle) is selected for a first AV dispatched to a geographic area, the vehicle manager 330 can retrieve this audio option selection and select a different audio option (e.g., a different jingle) for a second AV dispatched to the same geographic area. The UI server 310 may inform the intended user of each AV of their respective selected audio option so that the users can locate their correct AVs.

Example AV Use Cases

FIG. 4 is an example top view of an AV 400 with multiple speakers according to some embodiments of the present disclosure. The AV 400 includes four doors, including doors 410a and 410b, and four door handles, including door handles 415a and 415b. The AV 400 includes three speakers 420a-420c. The speakers 420a-420c are examples of the speaker 210 described with respect to FIG. 2. The AV 400 also includes a delivery container 430 and sensor suite 440. The delivery container 430 may be a specialized compartment configured to store items for delivery. The delivery container 430 may be accessed separately from the rest of the AV 400. In some embodiments, the delivery container 430 has features designed to protect items for delivery, e.g., the delivery container 430 may be heated, cooled, or padded. The sensor suite 440 is similar to the sensor suite 140 described with respect to FIG. 1.

Each of the four doors 410 may be equipped with an access sensor 220. For example, each door handle 415 has an integrated sensor that is triggered by movement of the door handle 415. Each of the four doors 410 on the AV 400 may have a separate access sensor 220. Similarly, the delivery container 430 may have an access sensor 220.

The speakers 420a-420c are located at different positions on the AV 400. In particular, speaker 420a is located above door 410a, and speaker 420b is located above door 410b, and speaker 420c is located near the front of the roof of the AV 400. In some embodiments, the audio notification system 150 selects a particular speaker to emit the audio notification based on an intended use of the AV 400, e.g., based on a location of a delivery. An example of this is shown in FIGS. 5A-5B.

In another embodiment, the audio notification system 150 selects a particular speaker to emit the audio notification based on a location of the user. The processor 260 may determine a location of the user relative to the AV 400, as described with respect to FIG. 2, and select the speaker closest to the user to emit the audio notification. For example, if the speakers are directed speakers, the speaker on a same side of the AV 400 as the user may be able to best provide the directed audio notification to the user. In some embodiments, the processor 260 determines an expected location of the user, without real-time data about the user's position. For example, if the AV 400 is directed to a particular address and stops in front of the address on the right hand side of the street, the processor 260 instructs the speaker 420*b* on the right hand side of the AV 400 to emit the audio notification.

Figure 5A:
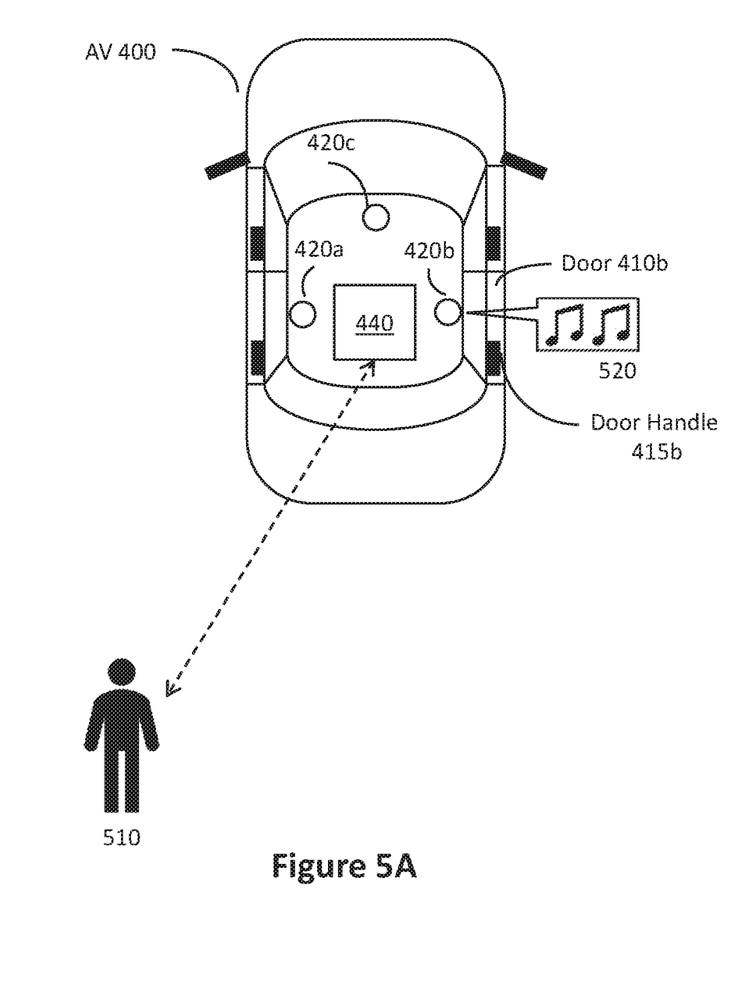
FIGS. 5A-5B illustrate an example use case of an example AV with a non-visual interface according to some embodiments of the present disclosure.
Figure 5B:
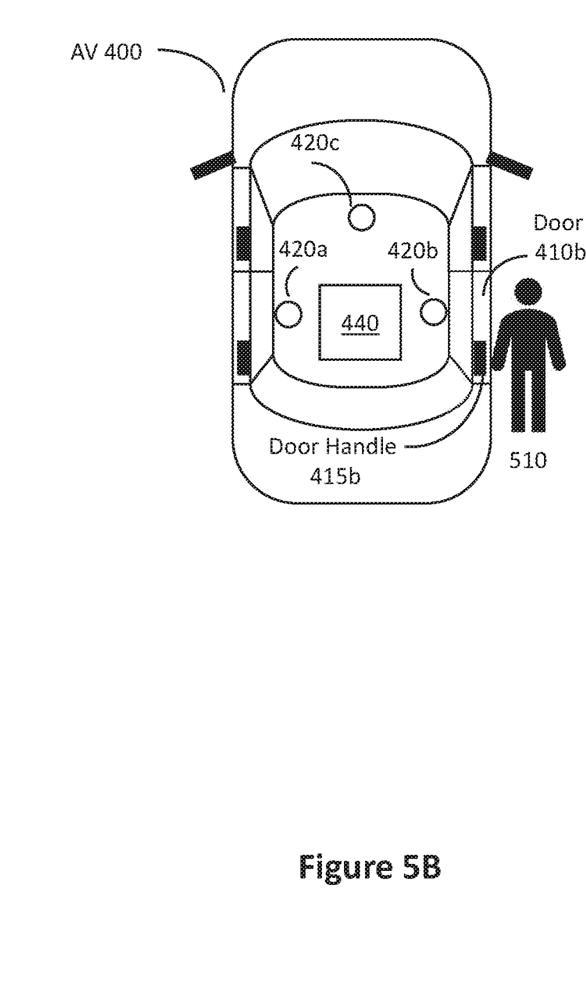

FIGS. 5A-5B illustrate an example use case of an example AV with a non-visual interface according to some embodiments of the present disclosure. In this example, the sensor suite 440 determines that a user 510 is in range of the AV 400. For example, a Bluetooth sensor in the sensor suite 440 detects a Bluetooth signal emitted by a mobile device carried by the user 510, or an onboard computer identifies the user 510 based on other sensor data (e.g., camera, RADAR, and/or LIDAR data) describing the environment of the AV 400 collected by the sensor suite 440.

In response to determining that the user 510 is within range of the AV 400, the AV 400 (e.g., the processor 260) instructs one of the speakers 420*b* to emit an audio notification 520, e.g., a jingle. In this example, the speakers 420*a*, 420*b*, and 420*c* are located at different locations on the AV 400, and the processor 260 selects one of the speakers 420*b* to emit the audio notification 520 based on a portion of the AV 400 to be accessed by the user 510 and the proximity of the speakers to the portion to be accessed. In this example, the door 410*b* is to be accessed by the user 510, e.g., if the AV 400 is making a delivery to the user, the item being delivered is located behind the door 410*b*, or if the AV 400 is picking up the user 510 for a ride, the user 510 is to sit in the seat behind door 410*b*. The processor 260 selects speaker 420*b* because it is the closest speaker to the door 410*b* to be accessed and instructs the speaker 420*b* to emit the audio notification 520.

The audio notification 520 directs the user 510 to the door 410*b*. The user reaches the door 410*b* and opens the door 410*b* with the door handle 415*b*, as shown in FIG. 5B. In response to the user 510 accessing the door 410*b*, the processor 260 instructs the speaker 420*b* to stop emitting the audio notification 520.

Example User Interface

FIG. 6 is an example user interface 600 for setting options for an audio notification according to some embodiments of the present disclosure. The example user interface 600 may be provided by the user device 130 and in communication with the UI server 310. The user interface 600 provides four selectable audio patterns 610, a volume slider 620, and a pitch slider 630. The audio patterns 610 may include, for example, one or more jingles; one or more series of beeps, tones, vibrations, or other sounds at one pitch or a set of pitches; one or more words or phrases, or other options. The user interface 600 may include more or less audio patterns 610 than shown in FIG. 6.

The volume slider 620 and pitch slider 630 allow the user to select a volume and a pitch for the audio notification, respectively. In other embodiments, volume and/or pitch are selected from a list of options, rather than through a slider. The volume 620 and pitch 630 may enhance accessibility for users. For example, a user who is hard of hearing can select a higher volume 620. A user who has difficulty hearing certain tones (e.g., tones in a higher range) can select a pitch that is audible to the user, e.g., a pitch in the lower range. On the other hand, a lower volume and/or a higher pitch can be selected to draw less attention to the ride share. For example, a blind user may select a high pitch that is audible to a guide dog, but not to humans; in this embodiment, the user's guide dog may identify the AV based on the audio notification and lead the user to the AV.

The user device 130 returns the user selections in the user interface 600 to the UI server 310. The vehicle management system 120 may store the selected audio options in the audio options database 620. In some embodiments, the vehicle management system 120 may store the user's audio settings as part of a user profile that is relied upon each time that user engages the AV service, e.g., each time the user hails a ride, or each time the user picks up a delivery.

While the user interface 600 is a graphical user interface, the user interface 600 may be accessible to a vision impaired user, or one or more alternative interfaces may be provided to provide audio options and receive user selections in a non-visual manner. For example, a screen reader (e.g., VOICEOVER) may provide spoken descriptions of the audio options and allow a user to select on-screen options without seeing the options. In another example, the vehicle management system 120 provides an audio-based user interface that outputs the audio notification options aurally and uses voice recognition to receive oral instructions from a user.

Example Methods for Providing Audio Notifications

Figure 7:
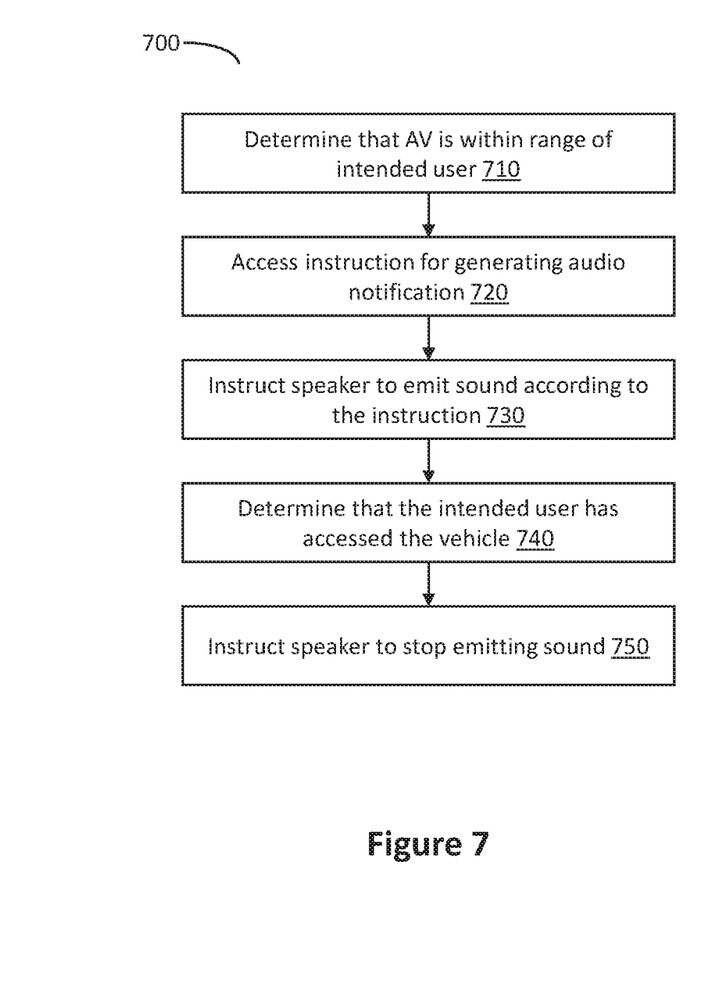
FIG. 7 is a flowchart of an example method for providing an audio notification to a user according to some embodiments of the present disclosure.

FIG. 7 is a flowchart of an example method 700 for providing an audio notification to a user according to some embodiments of the present disclosure. An audio notification system 150 (e.g., the processor 260, in conjunction with data from the wireless sensor 230 and/or location sensor 240) determines 710 that the AV 110 is within range of an intended user of the AV 110. The audio notification system 150 (e.g., the processor 260) accesses 720 instructions for generating an audio notification, e.g., from a memory 250. The audio notification system 150 (e.g., the processor 260) instructs 730 a speaker (e.g., speaker 210, or one or more of speakers 420) to emit sound according to the instruction. The audio notification system 150 (e.g., the processor 260 in conjunction with the access sensor 220) determines 740 that the intended user has accessed the AV 110. The audio notification system 150 (e.g., the processor 260) then instructs 750 the speaker (e.g., speaker 210, or one or more of speakers 420) to stop emitting the sound.

Figure 8:
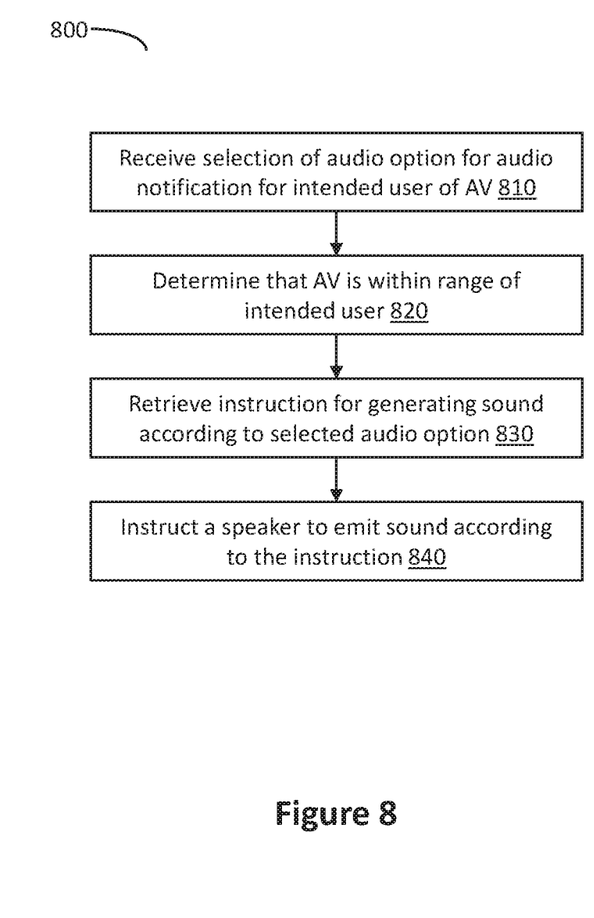
FIG. 8 is a flowchart of an example method for providing an audio notification according to a selected audio option according to some embodiments of the present disclosure.

FIG. 8 is a flowchart of an example method for providing an audio notification according to a selected audio option according to some embodiments of the present disclosure. An audio notification system 150 (e.g., the processor 260) receives 810 a selection of an audio option (e.g., from a UI server 310, from user interface 600) for an audio notification for an intended user of the AV 110. The audio notification system 150 (e.g., the processor 260, in conjunction with data from the wireless sensor 230 and/or location sensor 240) determines 820 that the AV 110 is within range of the intended user of the AV 110. The audio notification system 150 (e.g., the processor 260) retrieves 830 an instruction for generating sound according to the selected audio option, e.g., from a memory 250, or from an audio options database 320. The audio notification system 150 (e.g., the processor 260) instructs 840 a speaker (e.g., speaker 210, or one or more of speakers 420) to emit sound according to the instruction.

SELECT EXAMPLES

Example 1 provides audio notification system for a vehicle including a speaker configured to emit sound; a sensor configured to sense that a user has accessed the vehicle; and a processor. The processor is configured to determine that the vehicle is within a range of the user, access an instruction for generating a sound for notifying the user that the vehicle has arrived within the range of the user, provide the instruction to the speaker, and, in response to receiving a signal from the sensor indicating that the user has accessed the vehicle, provide an instruction to the speaker to stop emitting the sound.

Example 2 provides the audio notification system according to example 1, where the audio notification further includes a wireless sensor configured to sense a wireless signal output by a mobile device associated with the user (e.g., a Bluetooth signal), and where the processor is configured to determine that the vehicle is within the range of the user in response to receiving a signal from the wireless sensor indicating that the mobile device is within the range of the wireless sensor.

Example 3 provides the audio notification system according to example 1 or 2, where the processor is configured to determine that the vehicle is within the range of the user by receiving a current location of the vehicle, comparing the current location of the vehicle to a location associated with the user (e.g., a device location or an address), and determining that the current location of the vehicle is less than a predetermined distance from the location associated with the user.

Example 4 provides the audio notification system according to any one of the preceding examples, where the speaker is a directional speaker configured to focus emitted sound in a particular direction selected from a range of directions, and the processor is further configured to identify a location of the user, determine a direction of the user relative to the directional speaker based on the location of the user, and instruct the directional speaker to emit the sound in the direction of the user relative to the directional speaker.

Example 5 provides the audio notification system according to any one of the preceding examples, where the speaker is a first speaker located at a first location of the vehicle, the vehicle includes at least a second speaker located at a second location on the vehicle, and the processor is further configured to identify a portion of the vehicle to be accessed by the user, select one of the first speaker and the second speaker based on proximity to the identified portion of the vehicle, and provide the instruction for generating the sound to the selected speaker.

Example 6 provides the audio notification system according to any one of the preceding examples, where the sensor configured to sense that the user has accessed the vehicle is a sensor configured to sense whether one of a vehicle door, a trunk door, and a door to a delivery container is open.

Example 7 provides the audio notification system according to any one of the preceding examples, where the speaker is configured to emit sound according to a first sound setting, the first sound setting is a setting for one of an audio pitch, an audio pattern, and an audio volume, and the processor is further configured to instruct the speaker to emit the sound with a second sound setting different from the first sound setting.

Example 8 provides a method for providing a notification to a user, the method including determining that a vehicle is within a range of the user; accessing an instruction for generating a sound for notifying the user that the vehicle has arrived within the range of the user; in response to determining that the vehicle is within the range of the user, instructing a speaker on the vehicle to emit the sound according to the instruction; determining that the user has accessed the vehicle; and in response to determining that the user has accessed the vehicle, instructing the speaker to stop emitting the sound.

Example 9 provides the method according to example 8, where determining that the vehicle is within the range of the user includes sensing, by a wireless sensor of the vehicle, a wireless signal output by a mobile device associated with the user.

Example 10 provides the method according to example 8 or 9, where determining that the vehicle is within the range of the user includes receiving a current location of the vehicle, comparing the current location of the vehicle to a location associated with the user, and determining that the current location of the vehicle is less than a predetermined distance from the location associated with the user.

Example 11 provides the method according to any of examples 8 through 10, where the speaker is a directional speaker, and instructing the speaker to emit the sound includes identifying a location of the user, determining a direction of the user relative to the directional speaker based on the location of the user, and instructing the directional speaker to emit the sound in the direction of the user relative to the directional speaker.

Example 12 provides the method according to any of examples 8 through 11, where the vehicle includes a plurality of speakers located in different positions, and the method further includes identifying a portion of the vehicle to be accessed by the user, and outputting audio by a speaker of the plurality of speakers in a position associated with the identified portion of the vehicle to be accessed by the user.

Example 13 provides the method according to any of examples 8 through 12, where determining that the user has accessed the vehicle involves determining that a door to a compartment of the vehicle has been opened, where the compartment is one of a vehicle door, a trunk door, and a door to a delivery container.

Example 14 provides the method according to any of examples 8 through 13, where the instruction for generating the sound includes a first sound setting, the first sound setting is a setting for one of an audio pitch, an audio pattern, and an audio volume, and the method further includes determining that the user has not accessed the vehicle within a threshold period of time, and, in response to determining that the user has not accessed the vehicle within the threshold period of time, instructing the speaker to emit the sound with a second sound setting different from the first sound setting.

Example 15 provides the method according to any of examples 8 through 14, where the instruction for generating the sound includes a sound setting, the sound setting is a setting for one of an audio pitch, an audio pattern, and an audio volume, and the method further includes determining that the vehicle is within a second range of the user, the second range smaller than the range of the user; and, in response to determining that the vehicle is within the second range of the user, instructing the speaker to emit the sound with a different sound setting.

Example 16 provides a non-transitory computer readable medium storing instructions for providing a notification to a user. The instructions, when executed by a processor, cause the processor to determine that a vehicle is within a range of the user; access an instruction for generating a sound for notifying the user that the vehicle has arrived within the range of the user; in response to determining that the vehicle is within the range of the user, instruct a speaker on the vehicle to emit the sound according to the instruction; determine that the user has accessed the vehicle; and in response to determining that the user has accessed the vehicle, instruct the speaker to stop emitting the sound.

Example 17 provides the non-transitory computer readable medium according to example 16, where determining that the vehicle is within the range of the user involves receiving a current location of the vehicle, comparing the current location of the vehicle to a location associated with the user, and determining that the current location of the vehicle is less than a predetermined distance from the location associated with the user.

Example 18 provides the non-transitory computer readable medium according to example 16 or 17, where the speaker is a directional speaker, and instructing the speaker to emit the sound involves identifying a location of the user, determining a direction of the user relative to the directional speaker based on the location of the user, and instructing the directional speaker to emit the sound in the direction of the user relative to the directional speaker.

Example 19 provides the non-transitory computer readable medium according to any of examples 16 through 18, where the instruction for generating the sound includes a first sound setting, the first sound setting is a setting for one of an audio pitch, an audio pattern, and an audio volume, and the instructions further cause the processor to determine that the user has not accessed the vehicle within a threshold period of time and, in response to determining that the user has not accessed the vehicle within the threshold period of time, instruct the speaker to emit the sound with a second sound setting different from the first sound setting.

Example 20 provides the non-transitory computer readable medium according to any of examples 16 through 19, where instruction for generating the sound includes a sound setting, the sound setting is a setting for one of an audio pitch, an audio pattern, and an audio volume, and the instructions further cause the processor to determine that the vehicle is within a second range of the user, the second range smaller than the range of the user; and, in response to determining that the vehicle is within the second range of the user, instruct the speaker to emit the sound with a different sound setting.

Example 21 provides an audio notification system for a vehicle that includes a speaker configured to emit sound according to a plurality of audio options available for an audio notification, a memory configured to store instructions for generating sound according to the plurality of audio options, and a processor. The processor is configured to receive a selection of an audio option for notifying a user that the vehicle has arrived within a range of the user, determine that the vehicle is within the range of the user, retrieve from the memory an instruction for generating a sound according to the received selection, and provide the retrieved instruction to the speaker to emit sound according to the received selection.

Example 22 provides the audio notification system according to example 21, where the audio option is received at a vehicle management system from a user device, the audio option selected by the user in a user interface provided by the vehicle management system, and the audio option is transmitted from the vehicle management system to the vehicle.

Example 23 provides the audio notification system according to example 22, where the plurality of audio options include volume levels or pitches, and the audio option selected by the user is one of a volume level and a pitch.

Example 24 provides the audio notification system according to example 22 or 23, where the plurality of audio options include a plurality of audio patterns, and the audio option, or a second audio option, selected by the user is an audio pattern.

Example 25 provides the audio notification system according to example 21, where the audio option is selected by a vehicle management system, the vehicle management system is configured to transmit data describing the selected audio option to a user device of the user, and the user device is configured to output audio according to the transmitted data describing the selected audio option to inform the user of the selected audio option.

Example 26 provides the audio notification system according to example 25, where the audio option selected for the vehicle is different from an audio option selected for a second vehicle in a same geographic area as the vehicle.

Example 27 provides a vehicle management system that includes a user interface server and a vehicle manager. The user interface server is configured to communicate with a user interface with which a user accesses a service of the vehicle management system, the user interface configured to provide a plurality of audio options to the user, receive a user selection of one of the plurality of audio options, and transmit the selected audio option to the user interface server for storage by the vehicle management system. The vehicle manager is configured to select a vehicle in a fleet of vehicles to dispatch to the user, retrieve the selected audio option for the user from storage, and transmit the selected audio option to the selected vehicle, where the selected vehicle is configured to output an audio notification according to the selected audio option.

Example 28 provides the vehicle management system according to example 27, where the user interface is configured to provide the plurality of audio options and to receive the user selection in a non-visual manner.

Example 29 provides the vehicle management system according to example 27 or 28, where the plurality of audio options include volume levels or pitches, and the audio option selected by the user is one of a volume level and a pitch.

Example 30 provides the vehicle management system according to any of examples 27 through 29, where the plurality of audio options are a plurality of audio patterns, and the audio option, or a second audio option, selected by the user is an audio pattern.

Example 31 provides the vehicle management system according to any of examples 27 through 30, where the vehicle manager is configured to determine that the vehicle is within a range of the user, and in response to the determination, instruct the vehicle to output the audio notification according to the selected audio option.

Example 32 provides the vehicle management system according to any of examples 27 through 31, where the vehicle includes a plurality of speakers located in different positions, and the vehicle management system is further configured to identify a portion of the vehicle to be accessed by the user, and instruct the vehicle to output the audio notification from a speaker of the plurality of speakers located at a position associated with the identified portion of the vehicle to be accessed by the user.

Example 33 provides a method for providing an audio notification from a vehicle having a speaker, the method including receiving a selected audio option of a plurality of audio options for notifying a user that the vehicle has arrived within a range of the user; determining that the vehicle is within the range of the user; retrieving, from a memory storing instructions for generating sound according to the plurality of audio options, an instruction for generating a sound according to the selected audio option; and providing the retrieved instruction to the speaker to emit sound according to the selected audio option.

Example 34 provides the method according to example 33, where the method further includes providing the plurality of audio options to the user via a user interface, and receiving the selected audio option via the user interface, the selected audio option having been selected by the user.

Example 35 provides the method according to example 33 or 34, where the plurality of audio options include volume levels or pitches, and the selected audio option is one of a selected volume level and a selected pitch.

Example 36 provides the method according to any of examples 33 through 35, where the plurality of audio options include a plurality of audio patterns, and the audio option, or a second audio option, selected by the user is an audio pattern.

Example 37 provides the method according to any of examples 33 through 36, where the method further includes selecting, by a vehicle management system, the selected audio option; and transmitting, by the vehicle management system, data describing the selected audio option to a user device of the user, where the user device is configured to output audio according to the transmitted data describing the selected audio option to inform the user of the selected audio option.

Example 38 provides the method according to example 37, where the method further includes retrieving a second audio option selected for a second vehicle in a same geographic area as the vehicle, and selecting the audio option so that the audio option is different from the second audio option.

Example 39 provides the method according to any of examples 33 through 38, where the vehicle includes a plurality of speakers located in different positions, and the method further involves identifying a portion of the vehicle to be accessed by the user, and instructing the vehicle to emit the sound from a speaker of the plurality of speakers located at a position associated with the identified portion of the vehicle to be accessed by the user.

Example 40 provides the method according to any of examples 33 through 39, where the method further includes determining that the user has accessed the vehicle, and, in response to determining that the user has accessed the vehicle, instructing the speaker to stop emitting the sound.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An audio notification system for a vehicle, the audio notification system comprising:
   a first speaker configured to emit sound and located at a first location on the vehicle;
   a second speaker configured to emit sound and located at a second location on the vehicle;
   a sensor configured to sense that a user has accessed the vehicle; and
   a processor configured to:
      identify a portion of the vehicle to be accessed by the user,
      select one of the first speaker and the second speaker based on proximity to the identified portion of the vehicle,
      determine that the vehicle is within a range of the user,
      access an instruction for generating a sound for notifying the user that the vehicle has arrived within the range of the user,
      provide the instruction to the selected speaker, and
      in response to receiving a signal from the sensor indicating that the user has accessed the vehicle, provide an instruction to the selected speaker to stop emitting the sound.

2. The audio notification system of claim 1, the system further comprising a wireless sensor configured to sense a wireless signal output by a mobile device associated with the user, wherein the processor is configured to determine that the vehicle is within the range of the user in response to receiving a signal from the wireless sensor indicating that the mobile device is within the range of the wireless sensor.

3. The audio notification system of claim 1, wherein the processor is configured to determine that the vehicle is within the range of the user by:
   receiving a current location of the vehicle;
   comparing the current location of the vehicle to a location associated with the user; and
   determining that the current location of the vehicle is less than a predetermined distance from the location associated with the user.

4. The audio notification system of claim 1, wherein the selected speaker is a directional speaker configured to focus emitted sound in a particular direction selected from a range of directions, and the processor is further configured to:
   identify a location of the user,
   determine a direction of the user relative to the directional speaker based on the location of the user, and
   instruct the directional speaker to emit the sound in the direction of the user relative to the directional speaker.

5. The audio notification system of claim 1, wherein the selected speaker is a low-speed noise emitter configured to output a noise when the vehicle travels at a speed below a given speed.

6. The audio notification system of claim 1, wherein the sensor configured to sense that the user has accessed the vehicle is a sensor configured to sense whether one of a vehicle door, a trunk door, and a door to a delivery container is open.

7. The audio notification system of claim 1, wherein the selected speaker is configured to emit sound according to a first sound setting, the first sound setting is a setting for one of an audio pitch, an audio pattern, and an audio volume, and the processor is further configured to instruct the selected speaker to emit the sound with a second sound setting different from the first sound setting.

8. A method for providing a notification to a user, the method comprising:
   identifying a portion of a vehicle to be accessed by the user;
   selecting one of a plurality of speakers on the vehicle based on proximity of the selected speaker to the identified portion of the vehicle;
   determining that a vehicle is within a range of the user;
   accessing an instruction for generating a sound for notifying the user that the vehicle has arrived within the range of the user;
   in response to determining that the vehicle is within the range of the user, instructing the selected speaker on the vehicle to emit the sound according to the instruction;
   determining that the user has accessed the vehicle; and
   in response to determining that the user has accessed the vehicle, instructing the selected speaker to stop emitting the sound.

9. The method of claim 8, wherein determining that the vehicle is within the range of the user comprises sensing, by a wireless sensor of the vehicle, a wireless signal output by a mobile device associated with the user.

10. The method of claim 8, wherein determining that the vehicle is within the range of the user comprises:
    receiving a current location of the vehicle;
    comparing the current location of the vehicle to a location associated with the user; and
    determining that the current location of the vehicle is less than a predetermined distance from the location associated with the user.

11. The method of claim 8, wherein the selected speaker is a directional speaker, and instructing the directional speaker to emit the sound comprises:
    identifying a location of the user;
    determining a direction of the user relative to the directional speaker based on the location of the user; and
    instructing the directional speaker to emit the sound in the direction of the user relative to the directional speaker.

12. The method of claim 8, wherein the selected speaker is a low-speed noise emitter configured to output a noise when the vehicle travels at a speed below a given speed.

13. The method of claim 8, wherein determining that the user has accessed the vehicle comprises determining that a door to a compartment of the vehicle has been opened, wherein the compartment is one of a vehicle door, a trunk door, and a door to a delivery container.

14. The method of claim 8, wherein the instruction for generating the sound comprises a first sound setting, the first sound setting is a setting for one of an audio pitch, an audio pattern, and an audio volume, the method further comprising:
    determining that the user has not accessed the vehicle within a threshold period of time; and
    in response to determining that the user has not accessed the vehicle within the threshold period of time, instructing the selected speaker to emit the sound with a second sound setting different from the first sound setting.

15. The method of claim 8, wherein the instruction for generating the sound comprises a first sound setting, the first sound setting is a setting for one of an audio pitch, an audio pattern, and an audio volume, the method further comprising:
    determining that the vehicle is within a second range of the user, the second range smaller than the range of the user; and
    in response to determining that the vehicle is within the second range of the user, instructing the selected speaker to emit the sound with a different sound setting different from the first sound setting.

16. A non-transitory computer readable medium storing instructions for providing a notification to a user, the instructions, when executed by a processor, cause the processor to:
- identify a portion of a vehicle to be accessed by the user;
- select one of a plurality of speakers on the vehicle based on proximity of the selected speaker to the identified portion of the vehicle;
- determine that a vehicle is within a range of the user;
- access an instruction for generating a sound for notifying the user that the vehicle has arrived within the range of the user;
- in response to determining that the vehicle is within the range of the user, instruct the selected speaker on the vehicle to emit the sound according to the instruction;
- determine that the user has accessed the vehicle; and
- in response to determining that the user has accessed the vehicle, instruct the selected speaker to stop emitting the sound.

17. The non-transitory computer readable medium of claim 16, wherein determining that the vehicle is within the range of the user comprises:
- receiving a current location of the vehicle;
- comparing the current location of the vehicle to a location associated with the user; and
- determining that the current location of the vehicle is less than a predetermined distance from the location associated with the user.

18. The non-transitory computer readable medium of claim 16, wherein the instruction for generating the sound comprises a first sound setting, the first sound setting is a setting for one of an audio pitch, an audio pattern, and an audio volume, and the instructions further cause the processor to:
- determine that the user has not accessed the vehicle within a threshold period of time; and
- in response to determining that the user has not accessed the vehicle within the threshold period of time, instruct the selected speaker to emit the sound with a second sound setting different from the first sound setting.

* * * * *